United States Patent [19]
Dufour

[11] Patent Number: 5,187,872
[45] Date of Patent: Feb. 23, 1993

[54] AUTOMATIC CALIBRATION OF MAGNETIC COMPASSES

[75] Inventor: Martial J. Dufour, Kanata, Canada

[73] Assignee: Her Majesty the Queen in right of Canada, as represented by the Minister of Communications, Ottawa, Canada

[21] Appl. No.: 862,024

[22] Filed: Apr. 2, 1992

[51] Int. Cl.$^5$ .................................. G01C 17/38
[52] U.S. Cl. ...................... 33/356; 324/246; 364/571.04
[58] Field of Search ............ 33/356, 355 R, 357; 324/246, 260; 364/571.04, 571.02

[56] References Cited

U.S. PATENT DOCUMENTS

| | | | |
|---|---|---|---|
| 4,445,279 | 5/1984 | Tsushima et al. | 33/361 |
| 4,546,551 | 10/1985 | Franks | 33/356 |
| 4,600,883 | 7/1986 | Egli et al. | 324/246 |
| 4,698,912 | 10/1987 | Fowler et al. | 33/356 |
| 4,738,031 | 4/1988 | Alberter et al. | 33/356 |
| 4,797,841 | 1/1989 | Hatch | 33/355 R |
| 4,953,305 | 9/1990 | Van Lente et al. | 33/356 |
| 4,972,593 | 11/1990 | Dahlen et al. | 33/356 |
| 4,989,333 | 2/1991 | Helldörfer et al. | 33/356 |
| 4,995,165 | 2/1991 | Daniels | 33/355 R |
| 5,046,031 | 9/1991 | Wanous | 33/356 |
| 5,095,631 | 3/1992 | Gavril et al. | 33/356 |

FOREIGN PATENT DOCUMENTS

1263704  12/1989  Canada

Primary Examiner—William A. Cuchlinski, Jr.
Assistant Examiner—C. W. Fulton
Attorney, Agent, or Firm—Thomas Adams

[57] ABSTRACT

In a magnetic compass of the kind in which a sensor derives coordinates of a sensed magnetic field, automatic correction of hard-iron and soft-iron distortions is achieved by storing a set of measured values of the magnitude of the sensed magnetic field for different discrete directions of the alignment axis of the compass relative to an estimated origin. If measured values have been accumulated for more than a predetermined number, but not all, possible directions, values are interpolated for the remaining directions to provide a set of measured and interpolated values defining a substantially elliptical locus of the sensed magnetic field vector ($E_T$.) New coordinates for the estimated origin are derived and the measured values adjusted to take account of changes in the estimated origin. The heading is corrected for displacement of the origin due to hard-iron effect and for ellipticity of the locus due to soft-iron effects. Correction of soft-iron effect may be achieved by determining the phase rotation angle ($\Omega_e$) of the elliptical locus relative to the alignment axis of the compass; deriving the ratio ($E_R/E_L$) between a pair of counter-rotating vectors, one ($E_L$) representing the earth magnetic field component and the other ($E_R$) soft-iron distortion, their being the sensed magnetic field vector ($E_T$) and their phase difference $\phi_R$ being twice the rotation angle; and deriving from the ratio ($E_R/E_L$), the phase difference ($\phi_R$), and the estimated origin headings corrected for said magnetic field distortion.

48 Claims, 5 Drawing Sheets

AUTOMATIC CALIBRATION OF MAGNETIC COMPASSES

BACKGROUND

1. Field of the Invention

The invention relates to magnetic compasses, and is especially concerned with automatic calibration of magnetic compasses. The invention is especially, but not exclusively, applicable to magnetic compasses for use with terrestrial vehicles such as automobiles.

2. Description of the Prior Art

Known magnetic compasses used in vehicles comprise a sensor, for example a so-called flux gate sensor or a Hall effect sensor, and an electronic circuit for deriving, from the signals produced by the sensor, the magnitude and direction of the terrestrial magnetic field sensed by the sensor.

If there were no distortions, the terrestrial magnetic field vector displayed by the magnetic compass would sweep out a perfect circle, with its origin corresponding to the datum of the compass, as the vehicle was rotated through a complete circle. In practice, however, when a magnetic compass is used in a vehicle, the magnetic field sensed by the sensor is distorted by what are known as "hard-iron" effects and "soft-iron" effects, which result from permanent and induced magnetism, respectively, of the vehicle.

Soft-iron effect depends primarily upon the geometry of the vehicle and the permeability of the metal it comprises. Soft-iron effect produces a two-cycle error in 360 degrees, which causes the locus swept by the measured magnetic field vector to assume an elliptical pattern with its eccentricity varying as a function of degrees of error. The peak error due to the soft-iron effect might be as much as 20° to 30°, though usually it will be less than 10° for most locations on a vehicle.

Hard-iron effects are caused primarily by metal surrounding the sensor acting as a secondary source of emission. Hence, expansion and contraction of the metal surrounding the magnetic compass, together with vibration and other strong magnetic perturbations, cause the origin of the ellipse to deviate as a function of the amplitude and phase of the vector representing the hard-iron perturbation, typically producing a one-cycle error in 360 degrees.

If valid heading readings are to be obtained, the magnetic compass must be calibrated to compensate for these distortions. Manual correction techniques involve the positioning of small magnets around the sensor to compensate for perturbing magnetic fields. This process is fairly complex since the adjustments are made by positioning the vehicle at different angles while a skilled technician adjusts the positions of the small magnets.

Semi-automatic calibration techniques have been proposed which require position errors at different headings to be entered manually into a computer memory which then corrects the outputs from the flux gate sensors.

Various automatic compensation systems have been proposed. U.S. Pat. No. 4,953,305 issued Sep. 4, 1990 (Van Lente et al), and U.S. Pat. No. 4,546,551 issued October, 1985 (Franks) which are incorporated herein by reference, disclose a magnetic compass for a vehicle which comprises a magnetic field sensor of the flux-gate type and a microprocessor. The microprocessor corrects for the hard-iron and soft-iron effects by monitoring the maximum and minimum signals during movement through a complete 360° rotation or path of travel and continuously averaging the data. This method may not be entirely satisfactory where errors are due to tilting of the vehicle, which tend to be relatively slow. It will also tend to be noise sensitive.

U.S. Pat. No. 4,738,031 (Alberter et al), issued April, 1988, which is incorporated herein by reference, discloses a method of calibrating an electronic magnetic compass for soft-iron effects and U.S. Pat. No. 4,989,333 issued Feb. 5, 1991 (Helldörfer et al), which is incorporated herein by reference, discloses a further development of the magnetic compass disclosed in U.S. Pat. No. 4,738,031 which employs fast dynamic compensation or updating of "hard-iron" interfering field changes due to electrical changes caused by connecting or disconnecting loads in motor vehicles. This system of calibration makes use of a locus diagram and "bins" to keep track of the soft-iron and hard-iron perturbations vectors. It involves rotating the vehicle in which the compass is mounted through one or two full circles, determining the maximum and minimum values of the X and Y readings, and deriving the centre point of the elliptical polar frequency of the magnetic field. Thereafter, the semi-axes of the ellipse are established by determining the maximum and minimum values from that centre point. Such a system is not entirely satisfactory because it uses only a few points on the polar diagram and so is inherently sensitive to noise. Moreover, the methods proposed in U.S. Pat. No. 4,738,031 and U.S. Pat. No. 4,989,383 will tend to compensate for other non-permanent effects such as vehicle tilt and short term magnetic perturbations.

An object of the present invention is to at least mitigate the afore-mentioned disadvantages and provide a magnetic compass with improved automatic compensation for distortions.

SUMMARY OF THE INVENTION

According to one aspect of the present invention, there is provided a method of calibrating a magnetic compass comprising sensor means operable to supply signals representing the magnitude of a sensed magnetic field, preferably as at least two substantially mutually perpendicular coordinates, such sensed magnetic field comprising an earth magnetic field component and a magnetic field distortion component, and means responsive to said signals for providing a heading as the angular displacement of an alignment axis of the compass relative to magnetic north, the method comprising the steps of:

as the compass is displaced angularly, storing measured values of the magnitude of the sensed magnetic field for different discrete orientations of the alignment axis of the compass relative to an origin of the sensor;

if said measured values have been stored for more than a predetermined number, but not all, of said directions, interpolating, using estimated coordinates for said origin, values of the sensed magnetic field for directions for which measured values have not been accumulated to provide a complete set of values $(X_i, Y_i)$ corresponding to a complete rotation of the alignment axis, said set of values defining a substantially elliptical locus of a vector $(E_T)$ representing the sensed magnetic field;

deriving from said set of values new estimated coordinates for said origin and adjusting the stored measured values to take account of differences, if any, between the previous estimated origin coordinates and the new estimated origin coordinates; and deriving said heading taking into account ellipticity of said locus due to said local magnetic field distortion.

According to a second aspect of the present invention, a magnetic compass comprises sensor means operable to supply signals representing the magnitude of a sensed magnetic field, preferably as at least two substantially mutually perpendicular coordinates, such sensed magnetic field comprising an earth magnetic field component and a magnetic field distortion component, and means responsive to said signals for providing a heading as the angular displacement of an alignment axis of the compass relative to magnetic north, the means responsive to said signals comprising storage means for storing, as the compass is displaced angularly, measured values ($X_E, Y_E$) of the magnitude of the sensed magnetic field for different discrete orientations of the alignment axis of the compass relative to an origin of the sensor; interpolator means operable if said measured values have been stored for more than a predetermined number, but not all, of said directions, to interpolate, using estimated coordinates for said origin, values of the magnetic field for directions for which measured values have not been accumulated to provide a complete set of values ($X_i, Y_i$) corresponding to a complete rotation of the alignment axis, said set of values defining a substantially elliptical locus of a vector ($E_T$) representing the sensed magnetic field; origin computation means for deriving from said set of values new estimated coordinates for said origin, means, responsive to the set of values and the new estimated origin coordinates, for adjusting the stored measured values to take account of differences, if any, between the previous estimated origin coordinates and the new estimated origin coordinates; and means responsive to said set of values and said new estimated origin coordinates for deriving said heading taking into account ellipticity of said locus due to said local magnetic field distortion.

In either aspect of the invention, until a first set of ordinates have been computed, the estimated origin may be derived by averaging several values of said components of the sensed magnetic field.

The interpolating means and origin estimating means may repeatedly interpolate values and update the estimated origin coordinates a predetermined number of times before said ellipse parameters are computed, especially if the magnetic compass has not previously been calibrated.

Parameters of said ellipse may be stored when the compass is deactivated and used to regenerate the contents of the storage means when the compass is reactivated.

According to a third aspect of the invention, there is provided a method of calibrating a magnetic compass comprising a sensor means operable to supply signals representing the magnitude of a sensed magnetic field, preferably as at least two substantially mutually perpendicular coordinates, such sensed magnetic field comprising an earth magnetic field component and a magnetic field distortion component, and means responsive to said signals for providing a heading as the angular displacement axis of the compass relative to magnetic north, the method comprising the steps of:

deriving a set of values representing the direction and magnitude of a sensed magnetic field as the compass alignment axis is displaced angularly, said set of values defining a substantially elliptical locus of a full rotation of vector ($E_T$) representing the sensed magnetic field;

determining from said set of values the phase rotation angle ($\Omega_e$) of said elliptical locus relative to said alignment axis and coordinates of the origin of the elliptical locus;

deriving from said set of values the ratio between a pair of counter-rotating vectors, one of the pair of vectors ($E_L$) representing the earth magnetic field component and the other of said pair of vectors ($E_R$) representing non-permanent magnetic field distortion, the resultant of such pair of vectors comprising the sensed magnetic field vector ($E_T$) and the phase difference ($\phi_R$) between the vectors of the pair being twice the phase rotation angle ($\Omega_e$);

deriving from said ratio ($E_R/E_L$), said phase rotation angle ($\phi_R$), and said coordinates of the origin, headings corrected for said non-permanent magnetic field distortion.

According to a fourth aspect of the invention, a magnetic compass comprises sensor means operable to supply signals ($X_E\{k\}, Y_E\{k\}$) representing the magnitude of a sensed magnetic field, preferably as at least two substantially mutually perpendicular coordinates, said sensed magnetic field comprising an earth magnetic field component and a magnetic field distortion component, and means responsive to said signals for providing a heading as the angular displacement axis of the compass relative to magnetic north, the means responsive to said signals being functional to derive a set of values representing the direction and magnitude of a sensed magnetic field as the compass alignment axis is displaced angularly, said set of values defining a substantially elliptical locus of a full rotation of vector ($E_T$) representing the sensed magnetic field; determine from said set of values the phase rotation angle ($\Omega_e$) of said elliptical locus relative to said alignment axis and coordinates of the origin of the elliptical locus; derive from said set of values the ratio between a pair of counter-rotating vectors, one of the pair of vectors ($E_L$) representing the earth magnetic field component and the other of said pair of vectors ($E_R$) representing non-permanent magnetic field distortion, the resultant of such pair of vectors comprising the sensed magnetic field vector ($E_T$) and the phase difference ($\phi_R$) between the vectors of the pair being twice the phase rotation angle ($\Omega_e$); and derive from said ration ($E_R/E_L$), said phase rotation angle ($\phi_R$), and said coordinates of the origin, headings corrected for said non-permanent magnetic field distortion.

BRIEF DESCRIPTION OF DRAWINGS

Further features and objects of the invention will become apparent from the following description of an embodiment of the invention, which is described by way of example only and with reference to the accompanying drawings in which.

DESCRIPTION OF PREFERRED EMBODIMENTS

Figure 1:
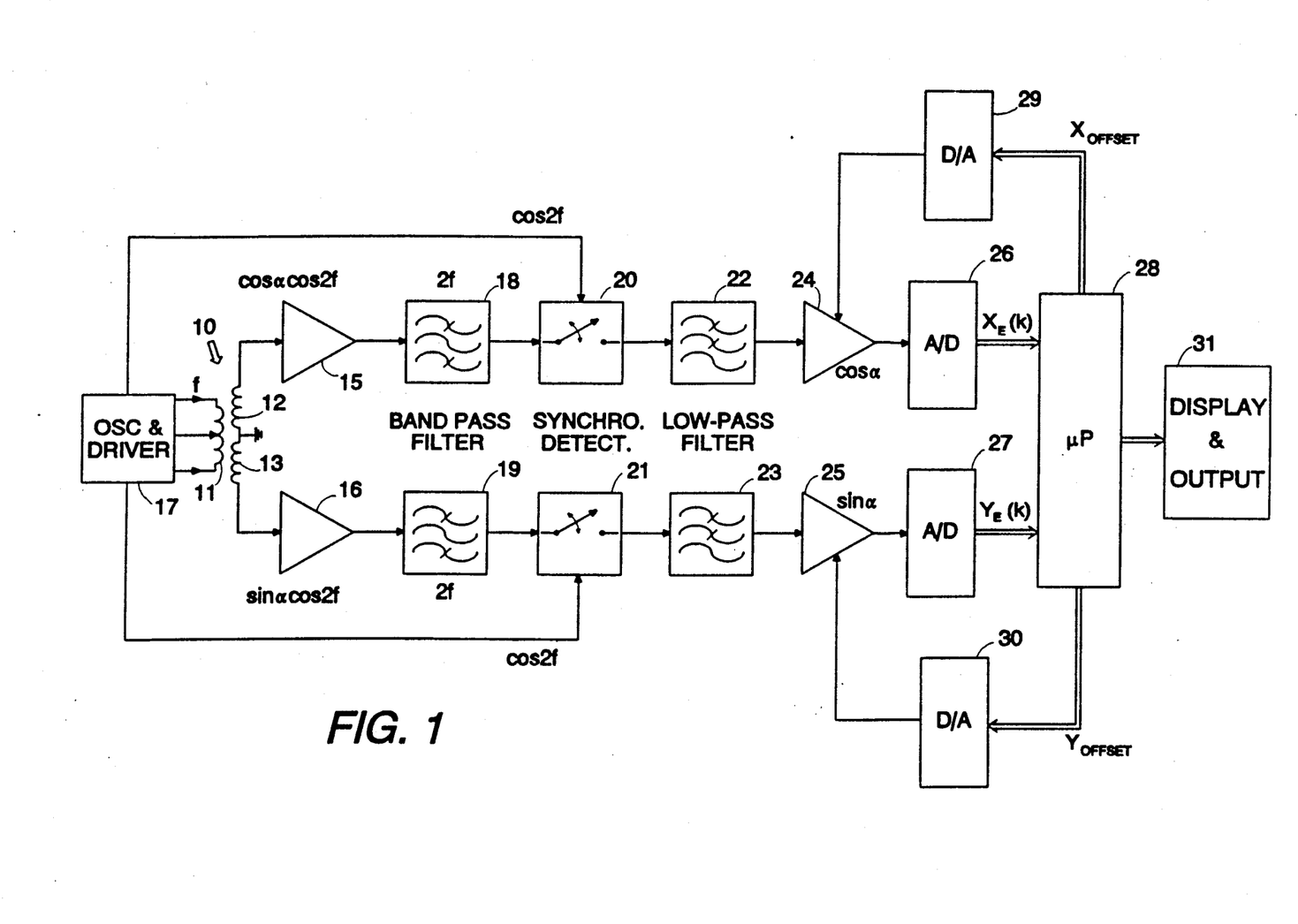
FIG. 1 is a block schematic diagram of a magnetic compass suitable for a vehicle.

Referring to FIG. 1, a magnetic compass for a terrestrial vehicle comprises a flux gate sensor 10 comprising a magnetic core (not shown) with a centre-tapped primary winding 11 wound around it. Two secondary windings 12 and 13 are wound around the same magnetic core but with their respective axes, designated X and Y, mutually perpendicular. The two secondary windings 12 and 13 are connected in common to a ground at one end and to amplifiers 15 and 16, respectively, at their other ends. The primary winding 11 is connected to an oscillator and drive circuit 17 which drives the primary winding 11 at a frequency f of, for example, one kilohertz. Other frequencies are possible, however, typically in the range 200 Hz to 10 KHz. The amplitude of the signal applied to the primary winding 11 is sufficient to drive the magnetic core into saturation.

The signals applied to the amplifiers 15 and 16, cosαcos2f and sinαcos2f, respectively, are in quadrature and at twice the frequency of the signal applied to the primary winding 11. The angle α is the orientation relative to magnetic north. Thus, when one represents the North-South direction, the other represents the East-West direction. The outputs of amplifiers 15 and 16 are filtered by bandpass filters 18 and 19, respectively, for removing noise and harmonics from the signals.

The filtered signals from bandpass filters 18 and 19 are applied to synchronous detectors 20 and 21, respectively, which are clocked by a clock signal cos2f supplied by the oscillator and driver 17. Synchronous detectors 20 and 21 operate like mixers to produce DC signals which are proportional in amplitude to the external magnetic field to which the windings 12 and 13 are subjected. The DC signals from synchronous detectors 20 and 21 are filtered by low pass filters 22 and 23, respectively, to remove noise, and then applied to amplifiers 24 and 25 respectively. Each of the filters 22 and 23 has a range of a few Hertz, for example up to five Hertz for terrestrial vehicle. Analogue-to-digital converters 26 and 27, respectively, convert the outputs from amplifiers 24 and 25 to digital signals $X_E(k)$ and $Y_E(k)$, respectively, which are processed by microprocessor 28.

A digital-to-analogue converter 29 converts a feedback signal $X_{OFFSET}$ from the microprocessor 28 to analogue form and applies it as a DC offset correction signal to amplifier 24. A similar DC correction signal $Y_{OFFSET}$ for amplifier 25 is generated by way of a corresponding feedback loop including digital-to-analogue converter 30. The level of DC offset correction is adjusted to set the amplifiers 24 and 25 to operate about a mean which is about half of the peak voltage used. These feedback loops for the DC offset correction also serve to correct the signals in the event that a large transient perturbation occurs which might induce a large offset error of, say, several volts.

The microprocessor 28 processes the signals $X_E(k)$ and $Y_E(k)$ to derive a heading vector representing the direction of the magnetic field sensed by the flux gate sensor 10, and then the heading of the vehicle. The microprocessor 28 supplies the information to an output display device 31 which may be of conventional construction and so will not be described in detail here.

Figure 2:
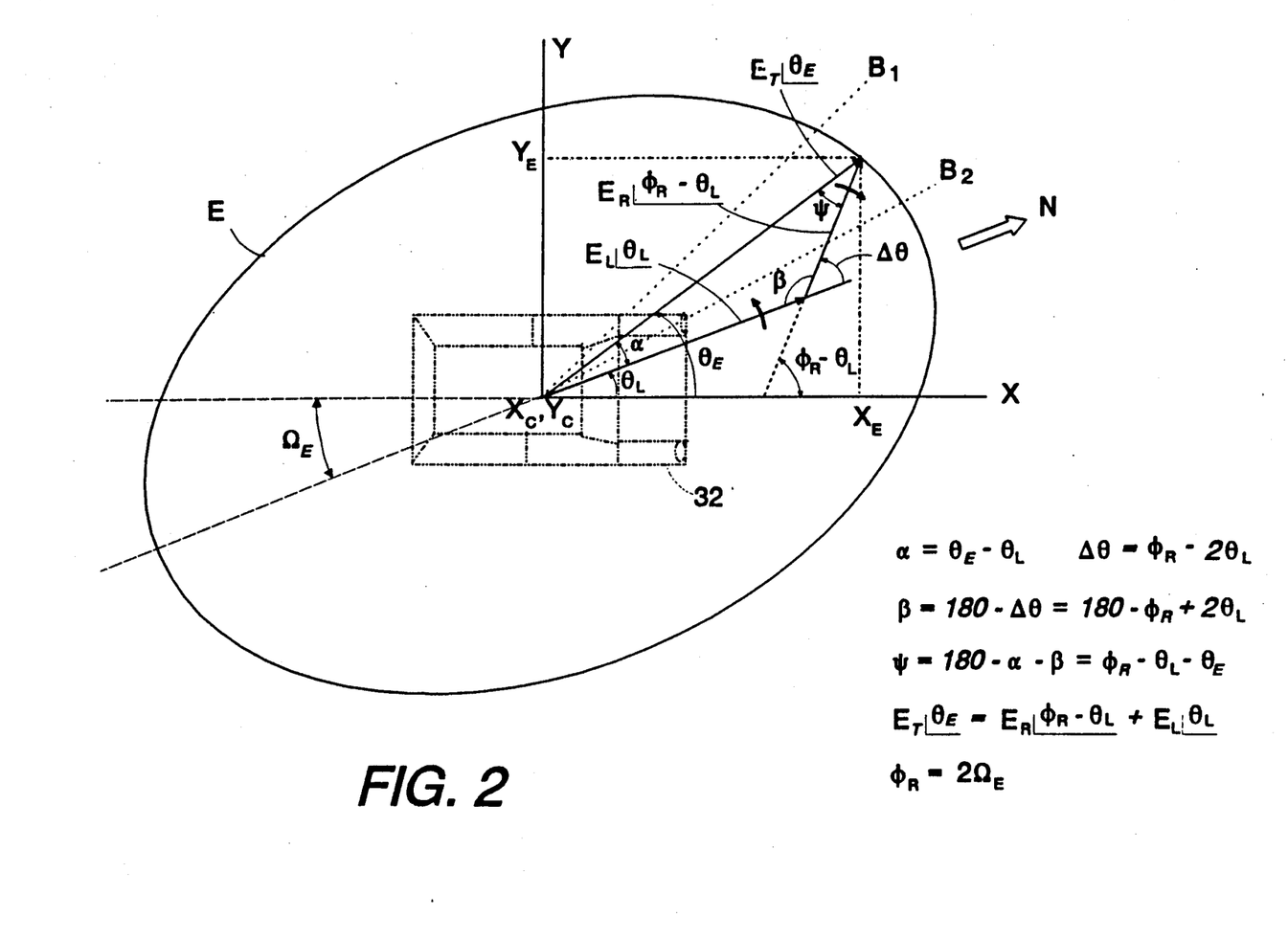
FIG. 2 is a diagram of a two-vector representation of the locus of the magnetic compass field vectors.

Referring to FIG. 2, the vehicle 32 in which the compass is mounted is represented in outline by broken lines. The various vector amplitudes and angles shown in FIG. 2 are measured relative to the datum of the magnetic compass which corresponds to the origin represented by ordinates $X_C$, $Y_C$ in FIG. 2. The flux sensor 10 (FIG. 1) is mounted in the vehicle 32 with its X axis aligned, usually, with the direction of travel of the vehicle, but not necessarily centred in the vehicle.

The outputs from the windings 12 and 13 of the flux sensor 10, pairs of values of $X_E(k)$ and $Y_E(k)$, respectively, define an uncorrected vector $E_T$ representing the measured magnetic field at the sensor 10. This includes a soft-iron perturbation component which is represented by vector $E_R$, and the earth magnetic field component, represented by vector $E_L$. Its origin will be affected by hard-iron effect.

As illustrated in FIG. 2, for clockwise rotation of the vehicle, vector $E_L \angle \theta_L$ rotates left, or anti-clockwise, and vector $E_R \angle \phi_R \cdot \theta_L$ rotates right, or clockwise, so that the locus E swept by the vector $E_T$ is an ellipse. The locus swept by the tip of vector $E_T$, for a full 360° rotation of vehicle 32, is approximated by an ellipse E. The ellipticity of the ellipse E will be determined by the amplitude of the soft-iron vector $E_R$ and its origin will be offset due to hard-iron effects.

To determine the compass (vehicle) heading $\Theta_L$ relative to magnetic north, the microprocessor 28 must compensate for both the amplitude of vector $E_R$ (soft-iron effect) and the offset of the origin (hard-iron effect). The signal processing functions involved in making these corrections will be described with reference also to FIGS. 3, 4 and 5.

Figure 3:
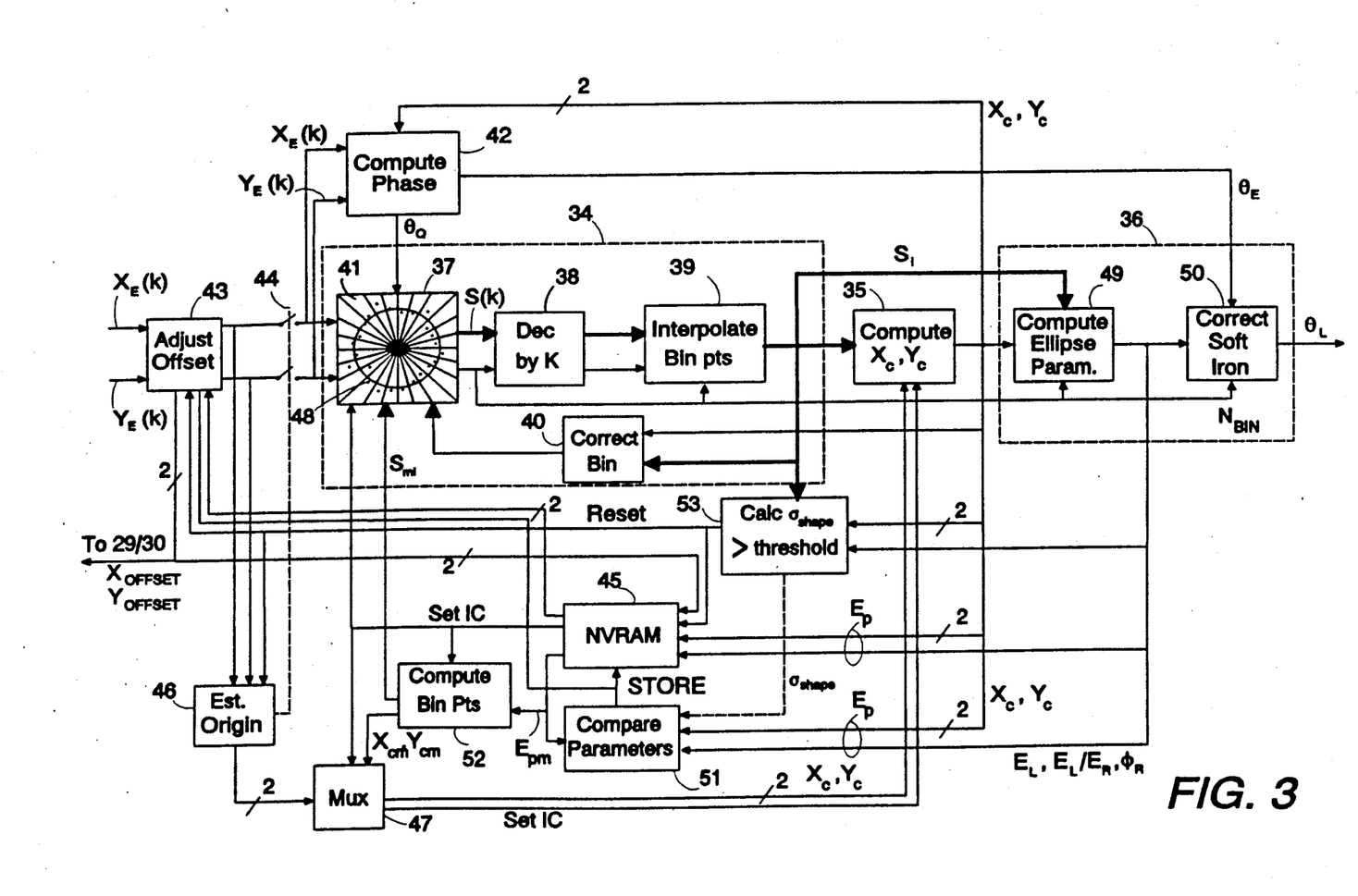
FIG. 3 is a block diagram illustrating the various functions performed by a microprocessor in the magnetic compass system.

Referring first to FIG. 3, the microprocessor 28 comprises trace pattern generating means 34 for providing a trace pattern representing the locus swept by the tip of vector $E_T$ during a complete rotation of the vehicle 32. The output $S_i$ (comprising values $X_i$ and $Y_i$) from means 34 is supplied to hard-iron correction means 35 and thence to soft-iron correction means 36, which will be described in more detail later, which correct for distortions in the trace pattern to provide a corrected heading $\theta_L$.

The trace pattern generating means 34 comprises storage means 37, a decimator 38, interpolator 39 and bin structure correction means 40. The storage means 37 is divided into a series of so-called "bins" 41, which are "radial" cells or storage locations. Each bin 41 represents a range of possible phase angles of the uncorrected vector $E_T$. Each bin 41 is addressed by a quantized phase signal $\theta_Q$ which is derived by phase computation means 42 from the pairs of values of $X_E(k)$ and $Y_E(k)$ and origin coordinates $X_C, Y_C$.

Although only 20 storage locations 36 are shown, the actual number of storage locations would be thirty-two, each with a range of 11.25 degrees. This number of bins would maintain the error due to phase quantization at approximately the same level that is generated by 8 bit A/D converters 26, 27, assuming an average signal which is 6 dB less than the peak signal input to the A/D converters 26, 27. Even greater resolution could be obtained by using a microprocessor 28 operating with more than eight bits and a correspondingly greater number of storage locations 36.

The values of $X_E(k)$ and $Y_E(k)$ derived from the A/D converters 26 and 27 (FIG. 1) are supplied to the storage means 37 by way of offset adjustment means 43 and an on/off switch 44. The offset adjustment means 43 derives the correction signals $X_{offset}$ and $Y_{offset}$, respectively, which it supplies to the amplifiers 24 and 25 by way of D-to-A converters 29 and 30, respectively, and also stores in a non-volatile ram NVRAM 45.

When the system is first turned on, the typically large electronic offset must be removed before the algorithm can proceed with the calibration of the compass. If there are no values of $X_{offset}$ and $Y_{offset}$ stored in the NVRAM 45, the offset adjustment means 43 will perform an offset scan of the X and Y axes until the input signals $X_E(k)$ and $Y_E(k)$ are centred in the range of the A-D converters 26 and 27. The offset adjustment means 43 will store in the NVRAM 45 the values of $X_{offset}$ and $Y_{offset}$ which will bring the amplitude of the input signals approximately into the middle of the X-Y window defined by the range of the A-to-D converters 26 and 27. When the system is next turned on, the offset adjustment means 43 will use the values stored in the NVRAM 45, eliminating the need for an offset scan. If, however, when the system is next turned on, the stored values fail to bring the input signal into an acceptable window or range for the A-to-D converters, the offset adjustment means 43 will perform a new offset scan and compute a new set of values for $X_{offset}$ and $Y_{offset}$. The offset adjustment means will also store in NVRAM 45 values of origin coordinates $X_C$ and $Y_C$ which are adjusted to reflect the change in the value of the offset (a linear offset being assumed) so that the calibration can proceed normally.

When the compass is first installed in the vehicle, the switch 44 is open, the bins 41 are empty, ($N_{BIN}$—the number of bins filled—is zero) and the origin coordinates $X_C$, $Y_C$ are unknown. Initially, centre estimation means 46 averages several values of $X_E(k)$ and $Y_E(k)$ to give an initial centre position $X_{C1}$, $Y_{C1}$ which it supplies by way of a multiplexer 47 to hard-iron correction means 35. The hard-iron correction means 35 normally computes coordinates $X_C$, $Y_C$ for the origin of the vector $E_T$ from the contents of the storage means 41, as will be described later. At the outset, however, it uses the values $X_{C1}, Y_{C1}$.

Once a predetermined number of values of $X_E(k)$ and $Y_E(k)$ values have been averaged, the centre estimation means 46 closes the switch 44 to supply digital signals $X_E(k)$ and $Y_E(k)$ to the storage means 41 and to phase computation means 42. From each pair of discrete values $X_E$, $Y_E$ of signals $X_E(k)$ and $Y_E(k)$ and the values of $X_C, Y_C$ from hard-iron correction means 35, the phase computation means 42 computes a quantized phase angle $\theta_Q$ which determines the storage bin 41 to which the corresponding pair of values of $X_E(k)$ and $Y_E(k)$ are assigned.

If a bin 41 already contains a pair of values for $X_E$, $Y_E$, the storage means 37 combines the new values, by averaging, with the values already there, using a digital filtering method which reduces the phase bin response time to give a desired speed of trace update. The time base for filtering of the values $X_E$ and $Y_E$ may be the same as the sampling for the $X_E(k)$ and $Y_E(k)$ input signals. For a terrestrial vehicle, a typical response time for updating the bin contents might be between 5 seconds and 10 seconds.

In FIGS. 3 and 5, each pair of values of $X_E(k)$ and $Y_E(k)$ is represented by a "bin point" 48 which corresponds to the tip of the vector $E_T$ defined by the pair of values $X_E$, $Y_E$. As the orientation of the vehicle changes, the pairs of $X_E$ and $Y_E$ values are accumulated continuously and allocated to the corresponding bins 41. As the vehicle is used, and the orientation of the sensor 10 changes, measured values for $X_E$ and $Y_E$ will be received and a partial trace bin pattern 500 will start to form, as shown in FIG. 5(a), in the first quadrant. The first estimate $X_{C1}$, $Y_{C1}$ of the centre of the ellipse is located virtually on the trace, far from what ultimately will be the centre position. Any heading displayed will be completely inaccurate initially, but this is of no consequence. Eventually, when the vehicle has turned through 360 degrees, the bin points 48 define a trace pattern representing the irregular, substantially elliptical locus of the vector $E_T$ generated by a complete rotation about origin $X_C$, $Y_C$.

It is not necessary, however, for the vehicle to complete a full 360 degree rotation before use since the system is arranged to use interpolated values for $X_E$ and $Y_E$ while the real values are being accumulated. Thus, the values $X_E$ and $Y_E$ from the storage means 37, represented by $S_i(k)$, are decimated by decimator 38 and supplied conveniently at intervals of, say, one minute, to interpolator 39. The number of bins 41 actually filled, $N_{BIN}$, also is supplied to the interpolator 39 from storage means 37.

When a predetermined number of bins 41 have been filled, for example 20 percent, interpolator 39 performs a linear interpolation upon the measured values of $X_E$, $Y_E$ to compute interpolated values of $X_E$ and $Y_E$ for all of the empty bins. As a result, the set of values $S_i$ comprises interpolated values in addition to the measured values.

Figures 5A, 5B:
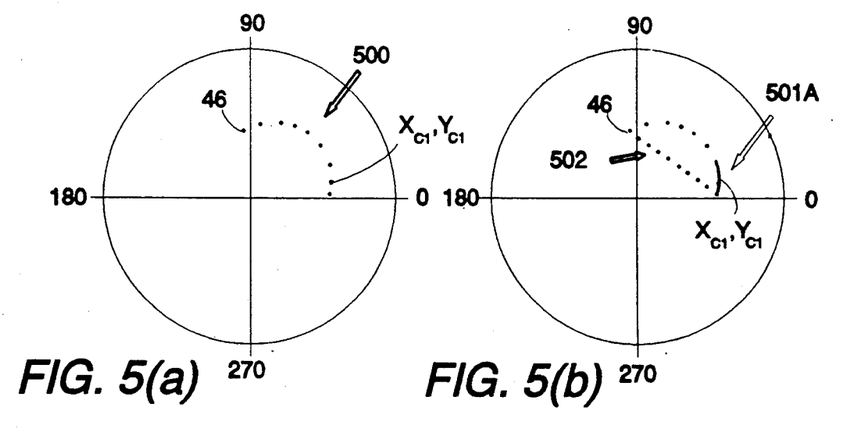
FIGS. 5(a) to 5(f) illustrate initialization of the magnetic compass.
Figure 5C:
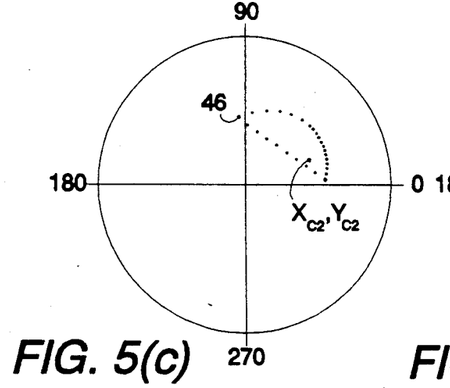
Figure 5D:
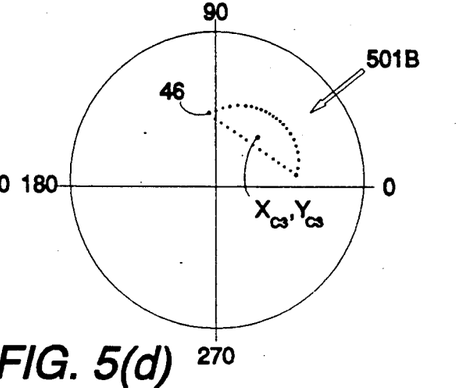

Since the bins 41 are all the same size, and the first estimated origin $X_{C1}$, $Y_{C1}$ is virtually on the same trace, the first iteration by the decimator 38, interpolator 39, centre estimation means 35 and bin correction means 40 will generate a very dense cluster 501A of interpolated values near the estimated origin $X_{C1}$, $Y_{C1}$ and a set of interpolated values on a line 502 joining the extremities of the segment of measured values 500, as shown in FIG. 5(b). At this stage, the hard-iron correction means 35 computes new estimated origin ordinates $X_{C2}$, $Y_{C2}$ by averaging all of the values, including both measured values and interpolated values, according to the expressions $$X_c = \frac{1}{N} \sum_{i=1}^{N} X_i \text{ and } Y_c = \frac{1}{N} \sum_{i=1}^{N} Y_n$$

where $X_i$ and $Y_i$ represent actual or interpolated values. As shown in FIG. 5(c), this new estimated origin is displaced away from the segment of measured values or bin points 500. The process of iteration is repeated based upon the new estimated origin $X_{C2}$, $Y_{C2}$, which causes a redistribution of the bin points as shown in FIG. 5(d) with a new origin $X_{C3}$, $Y_{C3}$ further away from the cluster of points. Because this new estimated origin $X_{C3}$, $Y_{C3}$ is further away from the trace, the cluster 501B is not as dense as before. It will be seen that, as the estimated origin moves further away from the trace, the spacing between points will gradually become uniform.

Since the values $X_E$ and $Y_E$ used to generate the bin points 48 are relative to the estimated origin, the contents of the storage means 37 must be updated to reflect the change in estimated origin position. Hence, bin structure address correction algorithm 40 recalculates the corresponding bin addresses of all of the bin points 48 using the current estimated origin coordinates $X_C$, $Y_C$. Referring again to FIG. 2, it will be appreciated that, for a particular pair of values of $X_E(k)$ and $Y_E(k)$, recalculating $X_C$ and $Y_C$ changes the value of angle $\theta_E$.

If the change is sufficient, the corresponding vector $E_T$ may no longer lie between B1 and B2, the broken lines delineating the limits of the bin, and the corresponding values of $X_E(k)$ and $Y_E(k)$ will need to be assigned to a different bin 41.

For a large change in the origin, such as the variation shown from FIG. 5(b) to FIGS. 5(c) and 5(d), recalculation may result in a previously-filled bin being empty and other bins having more than one bin point or pair of values. In the case of multiple bin points, the storage means 37 assigns the average value of those points to the bin so that any bin at any time is always represented by a unique pair of values of $X_E(k)$, $Y_E(k)$. Any emptied bin will be filled by interpolator 39 during the next iteration of the interpolation process. As before, interpolator 39 will assign a new value to the empty bin by linear interpolation between the closest "occupied" bins.

The combination of linear interpolation, centre estimation and bin structure correction is a continuous process that converges rapidly toward the exact centre of a given geometry of bin points.

During this primary initialization i.e. when the vehicle has not been calibrated previously at all, there will be a significant change in the position of the estimated origin relative to the true origin and several iterations might be needed to correct the difference. Typically, three iterations will be enough to give adequately close convergence of a given bin structure.

The system may be arranged to repeat the iteration, at the outset, in quick succession several times. When the vehicle has been operated some time, and a reasonable number of measured values for bin points collected, the iteration might be repeated less frequently because there will be little change in the position of the origin. Hence, the decimator 38 might initiate, say, three iterations for a given number of samples of $Y_E(k)$ and $X_E(k)$ until a predetermined number of bins have been filled, and only a single iteration for the same number of samples thereafter.

Figure 5E:
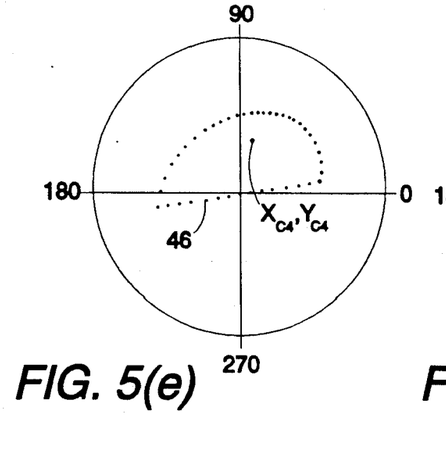
Figure 5F:
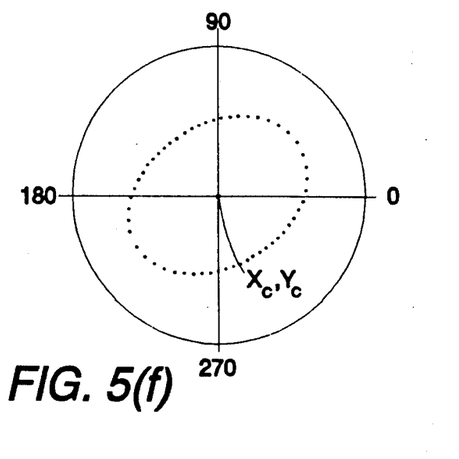

It will be appreciated that more measured values $X_E$ and $Y_E$ will be collected as the vehicle turns so the interpolator 39 will need to generate fewer interpolated values. FIG. 5(e) shows the trace after the vehicle has turned through approximately 180 degrees. Eventually, the vehicle will have completed 360 degrees of rotation and all bins will be filled with measured values for $X_E$ and $Y_E$. By this time, hard-iron effects have been corrected, and the estimated origin $X_C$, $Y_C$ is coincident with the true origin. Also the locus or trace pattern of bin points 48 is now approximately elliptical, as shown in FIG. 5(f). (It would be circular if there were no soft-iron distortion).

Although this primary initialization process requires a complete 360 degree vehicle rotation before hard-iron effects are completely corrected, it should be appreciated that the compass can be used, but with less accuracy, while this initialization is being performed.

When a predetermined number of bins 41 have been filled with measured values, conveniently 80 percent, the trace pattern of bin points ($S_i$) is deemed to be "close enough" and soft-iron correction means 36 used the values $S_i$ to correct the heading for soft-iron distortion. Soft-iron correction means 36 comprises ellipse parameter computing means 49, which uses the values $S_i$, comprising measured values from the storage means 37 and interpolated values from the interpolation means 39 to compute parameters $E_L$, $E_R/E_L$ and $\phi_R$, and soft-iron correction means 50, which derives from the parameters $E_R/E_L$, $\phi_R$, $X_C$ and $Y_C$ the required phase angle correction for soft-iron effects. The parameters define, at any instant, the ellipse E (FIG. 2) which is the closest approximation to the trace pattern approximated by the bin points 41.

In addition to computing the quantized phase angle $\Theta_Q$, as described earlier, phase computation section 42 computes a non-quantized or actual phase value $\theta_E = tg^{-1}\{(Y_E - Y_E/(X_E - X_C)\}$. Soft-iron correction means 50 derives a correction factor from the ellipse parameters and applies it to this actual phase value $\theta_E$ to provide a phase angle $\theta_L$ which is corrected for both hard-iron effects and soft-iron effects. This corrected phase angle $\theta_L$ is the heading of the compass relative to magnetic north and is supplied to display drive and output section 31 (FIG. 1) which generates the display in known manner.

When a predetermined number of measured values (bin points) have been accumulated, for example 90 percent or more, the ellipse parameters $E_P$ (comprising $E_L$, $E_R/E_L$ and $\phi_R$ and trace centre ordinates $X_C$, $Y_C$) are deemed to be VALID and are saved in the non-volatile memory NVRAM 45. The ellipse parameters $E_P$ and the stored ellipse parameters $E_{pm}$ from the NVRAM 45 are applied to a comparator 51. The comparator 51 compares the difference $|\{E_p\} - \{E_{pm}\}|$ with a threshold and, if it is greater, stores the ellipse parameters $E_P$ in the NVRAM 45. Typically, the new values of $E_P$ will only be saved if the parameters have changed by more than about 5 percent. This reduces hardware requirements, especially when EEPROMS are used. Consequently, when the compass is turned off, the NVRAM 45 holds the ellipse parameters $E_{pm}$. When the compass is turned on again, bin structure computation means 52 uses the ellipse parameters $E_{pm}$ to recalculate the corresponding theoretical bin points $S_{mi}$, which it supplies to the storage means 37, and origin coordinates $X_{cm}$ and $Y_{cm}$ which it supplies to the multiplexer 47. Hence, it is not necessary for the primary initialization process to be repeated. The bin structure or trace pattern so produced will be a close approximation to the bin structure that was in existence when the compass was shut down. The process can then continue from where it was just before the equipment turned-off.

It would be possible, of course, to save the most recent bin values themselves rather than the most recent trace parameters, but this is not preferred because it would require a larger non-volatile memory.

Figure 4:
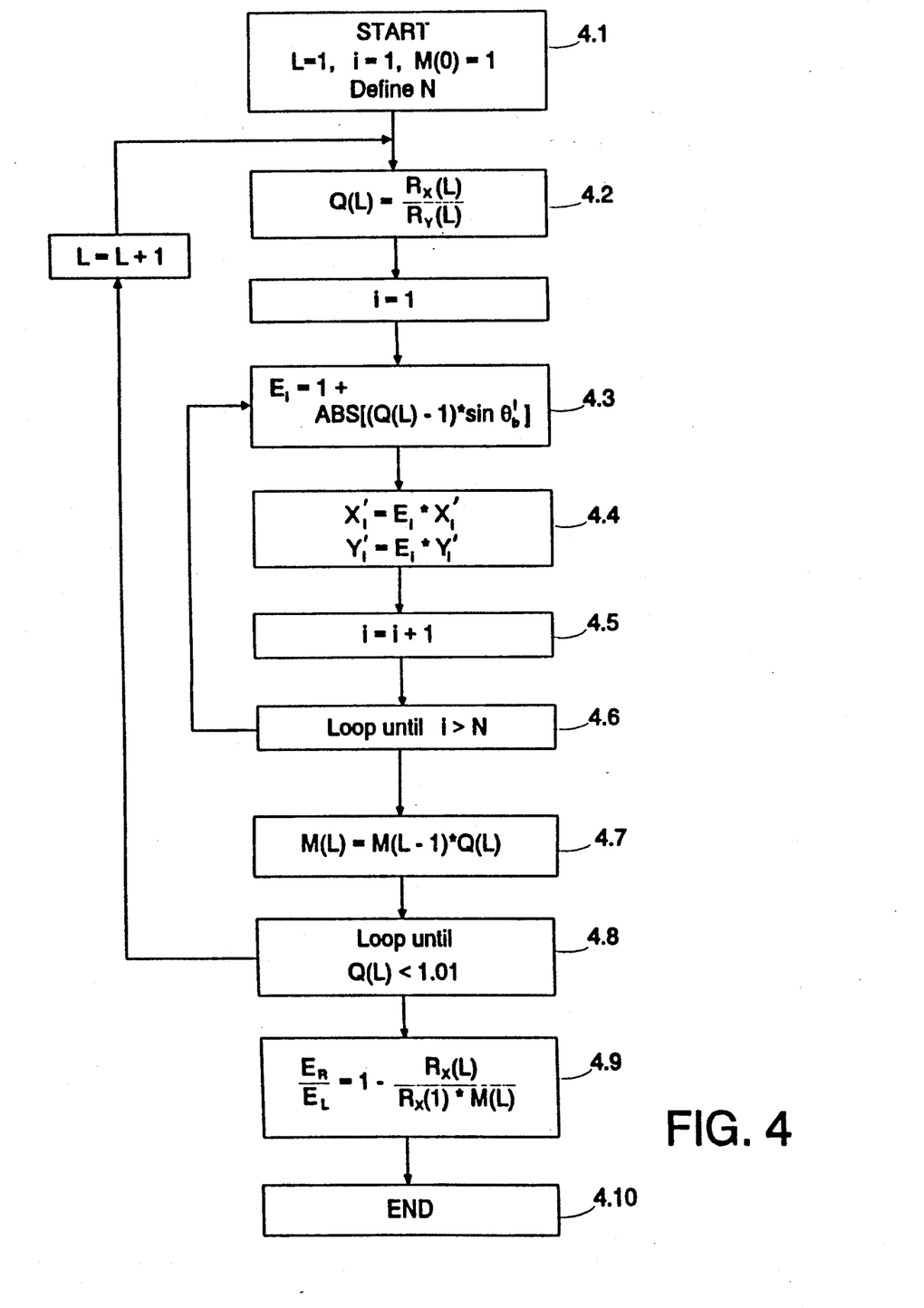
FIG. 4 is a flow chart depicting calculations performed by a trace parameter estimator.

Referring again to FIG. 3, the non-volatile memory NVRAM 45 and centre estimation means 46 can be cleared by a RESET signal which is generated by shape correlation means 53, which derives an X-Y shape correlation factor $\sigma_{shape}$ for the trace pattern of bin points 41 and compares it with a threshold. This factor $\sigma_{shape}$ represents the variance of the bin points relative to the theoretical shape of the trace i.e. the ellipse E. Shape correlation means 53 computes the factor $\sigma_{shape}$ from the ellipse parameters $E_L$, $E_R/E_L$ and $\phi_R$ as follows:

A new theoretical phase bin trace pattern is formed based on the value of the theoretical trace path $T|\Theta_E$, defined as:

$$T|\Theta_E = f(E_L, E_R, \phi_R, \Theta_L)$$
$$= E_L|\Theta_L + E_R|-\Theta_L + \phi_R$$

where the phase $\phi_R$ and the amplitude of $E_L$ and $E_R$ are given by:

$$\phi_R = 2\Omega_e$$
$$E_L \simeq R_X(1)$$

$$E_R \simeq \left(1 - \frac{R_X(L)}{R_X(1)M(L)}\right) R_X(1)$$

where $R_x$ is the average absolute value of the bin points with respect to the X' axis and M(L) is the total expansion or incremental ratio, at iteration L, the values for $R_x(L)$ and M(L) being taken from the latest calculation of the ellipse expansion ratio, to be described later with reference to FIG. 4. The amplitude accuracy of $E_L$ and $E_R$ using those relations is better than 5% for an axial ratio of up to a factor 3.

By mathematically incrementing $\Theta_L$ (the heading of the compass relative to the magnetic north), the points of a new theoretical phase bin are built using the values generated by the trace $T|\Theta_E$. These points are compared to the actual measurement using the following approximating correlation figure:

$$\sigma_{shape} = \frac{\sum_{i=1}^{N} |R_b{}^i - R_{bt}{}^i|}{\sum_{i=1}^{N} |R_b{}^i|}$$

where $R_b{}^i$ and $R_{bt}{}^i$ are the amplitudes of the measured and theoretical bin points, respectively. N is the number of bins in the actual system.

The factor $\sigma_{shape}$ is used to estimate the compass compensation accuracy. A sudden increase in the value of factor $\sigma_{shape}$ indicates a sudden increase in the magnetic perturbation which results in a reduced compass accuracy. If the factor $\sigma_{shape}$ exceeds the threshold, the RESET signal clears the memory 44 and centre estimation means 38 which restarts the primary initialization process automatically. Alternatively, the RESET signal may simply indicate to the user that the accuracy is diminished, and assist the user in locating the compass in a better magnetic area.

It is envisaged that the value of $\{E_p\} - \{E_{pm}\}$ could be compared with the instant value of $\sigma_{shape}$, or a reference proportional to it, so as to avoid storing new parameters resulting from an abnormal perturbation of the detected magnetic field.

Also, the offset adjustment means 43 will not only derive the offset correction at start up, but also whenever, during normal operation of the compass, a sudden severe magnetic perturbation takes the signals $X_E(k)$ and $Y_E(k)$ outside the range of the A-to-D converters 26 and 27, which may well happen with an 8 bit sampler. In such a case, if the saturation appears to be permanent, the $\sigma_{shape}$ calculation means 53 will also reset the offset adjustment means 43.

The way in which the compute ellipse parameters means 49 calculates the parameters will now be described in more detail. Referring again to FIG. 2, the pair of coordinates $X_E$, $Y_E$ define the uncorrected sensed magnetic field vector $E_T$ according to the expression $$E_T \angle E = E_R \angle (\phi_R \theta_L) + E_L \angle \theta_L$$

The component vector $E_L$ is the larger of the two and corresponds to the terrestrial magnetic field, the phase angle $\theta_L$ being the compass heading relative to magnetic north. The component vector $E_R$ represents the magnetic field perturbation due to the effect of the soft-iron surrounding the sensor 10. The phase angle $\phi_R$ is its orientation relative to magnetic north when the alignment axis of the compass is aligned with magnetic north.

The vector $E_R$ rotates at the same rate as $E_L$ but in the reverse direction i.e. $\theta_R = -\theta_L$. The ellipse parameter computation means 49 calculates the phase difference $\phi_R$ of the two rotating vectors when the vector $E_L$ is aligned with the X axis. First, however, means 49 calculates the "tilt" or ellipse phase rotation angle $\Omega_e$ (FIG. 2), relative to the X (alignment) axis. (Although, in FIG. 2, $\Omega_e$ appears to be equal to $\theta_L$, it need not be). While an exact solution using the points representing the trace pattern or locus could be derived, the preferred approach is to use an iterative method that will converge toward the exact phase rotation value. The algorithm used is based upon a bisection method that converges towards the minimum over $\theta$ of the following summation:

$$S(\theta) = \sum_{i=1}^{N} (R_b{}^i)^2 |\cos(\theta_b{}^i - \theta)|$$

where $R_b{}^g$ and $\Theta_b{}^i$ are the polar amplitude and phase, respectively, of the individual actual and interpolated bin points. $R_b{}^i$ is computed from the X-Y values using:

$$R_b{}^i = \sqrt{(X_i - X_C)^2 + (Y_i - Y_C)^2}$$

The phase value $\theta_{min}$ which minimizes $S(\theta)$, can be shown to correspond to the phase rotation angle $\Omega_e$ of the ellipse:

$$\Omega_e = \Theta_{min}$$

Derivation of the phase angle $\phi_R$ is based upon the fact that, when both vectors $E_R$ and $E_L$ align to form the major ellipse axis, it is because both have moved in opposite directions by a phase distance equal to half the value of $\phi_R$. Given that the ellipse pattern rotation angle is $\Omega_e$, the relative orientation $\phi_R$ from the magnetic north of the soft-iron perturbation $E_R$ is expressed as $\phi_R = 2\Omega_e$.

The ellipse parameter computation means 49 also computes the ratio $E_R/E_L$ between the vectors $E_R$ and $E_L$ by first rotating the $(X_i - X_C)$ and $(Y_i - Y_C)$ axes by the value of the ellipse phase rotation angle $\Omega_e$. This forms new axes X' and Y', aligned with the major and minor axes, respectively, of the ellipse E. In essence, this transforms the ellipse E so that its major axis is aligned with the X axis of FIG. 2. The transformation equations for the rotation produce transformed bin point values $X_i'$ and $Y_i'$ as follows:

$$X_i' = (X_i - X_C)\cos(\Omega_e) + (Y_i - Y_C)\sin(\Omega_e)$$

$$Y_i' = (Y_i - Y_C)\cos(\Omega_e) - (X_i - X_C)\sin(\Omega_e)$$

In order to evaluate the vector ratio $E_R/E_L$, the preferred approach is to use an algorithm that will converge toward the correct ratio of $E_R/E_L$, without the use of complex mathematics. The preferred implementation is based on the measurement of the absolute averages $R_x$ and $R_y$ of the bin point values $X_i'$ and $Y_i'$ relative to the X and Y axes, respectively, combined with a technique that expands values until the average absolute values relative to both the minor axis and the major axis are equal, i.e. the ellipse becomes a circle. During the expansion process, the algorithm keeps track of the expansion ratio Q(L). When the absolute average values $R_X(L)$ and $R_Y(L)$ become equal, the total expansion ratio M(L) is related to the vector ratio $E_R/E_L$ of the ellipse before expansion.

Referring to the detailed flowchart shown in FIG. 4, the average absolute value of the bin points with respect to the X' axis is defined as:

$$R_X(L) = \frac{\pi}{2N} \sum_{i=1}^{N} |X_i'|$$

and relative to the Y' axis as:

$$R_Y(L) = \frac{\pi}{2N} \sum_{i=1}^{N} |Y_i'|$$

where L is the number of iterations, and $X_i'$ and $Y_i'$ are the structure bin points after axis rotation and expansion. In step 4.2 of FIG. 4, the ratio Q(L), which represents a current estimate of the expansion ratio of the ellipse, is defined as:

$$Q(L) = \frac{R_X(L)}{R_Y(L)}$$

Step 4.7 of the algorithm keeps track of the successive calculation of Q(L) using a factor defined as:

$$M(L) = M(L-1) \cdot Q(L) \quad L = 1, 2 \ldots n$$

initial condition set as M(0)=1, as in step 4.1.

For each iteration of the loop comprising steps 4.3, 4.4, 4.5 and 4.6, step 4.4 expands all the points representing the ellipse pattern in the direction of the minor axis Y' by the ratio $E_i$, which is defined in step 4.3 as:

$$E_i = 1 + ABS\{[Q(L)-1] \cdot \sin\theta_b^i\}$$

where $\theta_b^i$ is the phase of the bin point i.

When the expansion ratio Q(L) approaches unity, specifically Q(L)<1.01, as in step 4.8, the program exits from the loop. The value of the original ratio of $E_R/E_L$ is then derived using the fact that the total expansion ratio M(L), after correction for the average envelope variation of the points in the X' direction, $R_X(1)/R_X(L)$, is related to $E_R$ and $E_L$ as follows:

$$\frac{R_X(1)}{R_X(L)} \cdot M(L) = \frac{E_L}{E_L - E_R}$$

from which step 4.9 gives:

$$\frac{E_R}{E_L} = 1 - \frac{R_X(L)}{R_X(1)M(L)}$$

Once all the ellipse shape parameters have been determined, the soft-iron correction algorithm 50 calculates the phase difference α (FIG. 2) between the sensed magnetic field vector $\theta_E$ and the left-rotating earth magnetic field vector $\theta_L$. The phase $\theta_E$ is computed by phase computation means 42 from the most recent $X_E(k)$, $Y_E(k)$ sample points and is given by $$\theta_E = \tan^{-1} \frac{Y_E(k) - Y_C}{X_E(k) - X_C}$$

Using the sine law and the relation between the angles α, β and Ψ:

$$\frac{E_R}{\sin(\theta_E - \theta_L)} = \frac{E_L}{\sin(\phi_R - \theta_L - \theta_E)}$$

In practice the phase error $(\theta_E - \theta_L)$ is likely to be smaller than 30 degrees deviation for any normal magnetic perturbation. Accordingly, the small angle approximation for a sinusoid function can be applied which, after some transformation, leads to the following result:

$$\theta_E - \theta_L \approx \frac{E_R}{E_L} \sin(\phi_R - \theta_L - \theta_E)$$

or $$\theta_L \approx \theta_E - \frac{E_R}{E_L} \sin(\phi_R - \theta_L - \theta_E)$$

$\theta_L$ occurring on both sides of the equation.

An exact solution can be derived using the axial ratio for the minor and major axes, and the tilt angle $\Omega_e$ of the ellipse, as follows:

$$\theta_L = \tan^{-1} \left\{ \frac{\left(\frac{1 + E_R/E_L}{1 - E_R/E_L}\right)((Y_E(k) - Y_C)\cos(\Omega_e) - (X_E(k) - X_C)\sin(\Omega_e))}{(X_E(k) - X_C)\cos(\Omega_e) + (Y_E(k) - Y_C)\sin(\Omega_e)} \right\} + \Omega_e$$

Such a complex formula for $\theta_L$ would be difficult to implement in a small processor with limited arithmetic capabilities, so it is preferable to transform the above relationship into an iterative process which converges toward the exact solution. Hence, the soft-iron correction means 50 actually uses the iteration:

$$\theta_L^{n+1} \approx \theta_E - \frac{E_R}{E_L} \sin(\phi_R - \theta_L^n - \theta_E),$$

with the initial conditions $\theta_L^0 = \theta_E$. This choice of initial conditions ensures the convergence of the process under all conditions. The degree of convergence is such that an initial position error of 30 degrees is reduced to less than one degree after four iterations.

After a number of iterations, $\theta_L$ is the corrected heading of the compass, which the soft-iron correction means 50 supplies to the display device 31 (FIG. 1).

In a computer simulation, for an ellipse having an axial ratio of 3($E_R/E_L = \frac{1}{3}$) and a soft-iron vector phase delay of $\phi_R = 50°$, the peak phase error over the whole trace was ±30 degrees. After application of the described algorithm, the phase error was reduced to less than ±2 degrees peak. This simulation also included the effect of random noise on the bin points.

The invention comprehends various alternatives and modifications to the specific embodiment described above. For example, in the specific embodiment, for simplicity, the bin points 41 are allowed to be anywhere in the particular bin. If preferred, however, they could be restricted to a limited range in the middle of the bin.

The rate of calculation of the new centre position estimate can be constant or related to the rate of turn of the mobile. For terrestrial mobile applications, a constant repetition rate from 1 to 15 minutes can be used without problem, while for maritime applications, it can be extended to take into account the typical slow rate of turn experienced by a boat. In any case, the best performance will likely be obtained if the update rate is adjusted as a function of the number of bins updated in a given period of time. For example, a new centre update could be calculated if the number of phase bins updated in a period of time is greater than a fixed value of, say, 32 bin rotation in less than one hour (for the 32 bins implementation it corresponds to 360 degrees in less than one hour). Thus, if the vehicle completes a full rotation in a given period of time, the algorithm will try to obtain a new estimate of the parameters. If the vehicle takes longer, the algorithm will keep the old parameters. This approach has the advantage of correcting for the error introduced by the amplitude variation of the horizontal earth magnetic field, occurring when there is a long range North-South displacement with limited vehicle rotation.

It is envisaged that decimation could be related to the rate of turn of the vehicle with the decimator 38 supplying values to the interpolator at short intervals when the rate of turn is higher.

Calculation of $S(\theta)$ using the square of the average bin points amplitudes, as described earlier, is preferred because it eliminates the $1/R_b^i$ variation effect in the density of points due to the bin structure. This effect is due to the density of points of the trace changing inversely with the value of $R_b^i$, so that the groups of points 501A/B (FIG. 5) closer to the centre tend to have more weight in the calculation of the minimum phase value of $S(\theta)$. For a large elliptic axial ratio for example, there are significantly more points around the minor axis which could affect unfavourably the minimum phase value. In some circumstances, however, such as where the mathematical capacity of the microprocessor 28 is limited, the bin point amplitudes could be summed directly, the resulting summation becoming:

$$S(\theta) = \sum_{i=1}^{N} R_b^i |\cos(\theta_b^i - \theta)|$$

This method gives good results and is relatively simple to implement with a microprocessor 28 which has relatively limited mathematical capacity.

Although the preferred way of computing $R_b^i$ described earlier is to calculate the root mean square, the following relationship may be used to give increased speed:

$$\frac{3 \cdot R_b^i}{2} \simeq \left( W + S + \frac{|W \cdot S|}{2} \right)$$

where $W = |X_b^i - X_C|$
$S = |Y_b^i - Y_C|$

Other approaches can be used to evaluate the ellipse axial ratio. One of them is to apply a least-squares straight line method to the $X'^2$ and $Y'^2$ points, from which the axial ratio can be calculated. However, the calculation is complex and requires multiplication up to the power of six and the use of square roots.

Unlike earlier magnetic compass systems, which require initialization, before use, by rotating the vehicle through 360°, the algorithm used by embodiments of the present invention will calibrate the compass while the vehicle is being driven indiscriminately, i.e. no particular path or rate of turn.

Various techniques could be used to reduce the minimum rotation required during initialization to give acceptable calibration. For example, instead of linear interpolation, a second order interpolation, based on the average curvature radius of the bin points, could be used. This technique could drastically reduce the required minimum rotation angle and be used, for example, with a vertical axes sensor or fast calibration compass.

Other techniques can be used to reduce this rotation to 90 degrees or less. For example, for a given geographical location, the average radius of the X-Y trace may be known. While such a technique ensures a fast convergence towards the centre position, it should be used cautiously because it also tends to be unpredictable when the compass is subject to severe soft-iron perturbation.

An advantage of embodiments of the present invention is that they are less sensitive to noise. Their use of a technique which resolves the vectors $E_L$, $E_R$ of the trace or locus of the accumulated X, Y values does not require a specific orientation and does not require the vehicle to be manoeuvred through a specific rotation path to calibrate the compass before the compass can be used. The accuracy of the calibration is substantially independent of the specific path traversed and variation in the rate of turn of the vehicle. Because they employ what can be considered to be medium to long term correction, embodiments of the invention will tend to average out non-permanent effects due, for example, to vehicle tilt.

Embodiments of the invention use a bin averaging process that smooths out any errors in the parameter calculation of the hard-iron and soft-iron error effects. Errors due to tilt and rapid magnetic perturbation will tend to be averaged out by such a process in which all of the points representing the polar diagram are weighted equally and linearly in different summations that calculate the parameters of the ellipse pattern.

Errors due to noise in the bin points affect the overall accuracy of the compass in a linear rather than squared manner. This gives better results when magnetic noise causes large variations in some of the bin points.

I claim:

1. A method of calibrating a magnetic compass comprising sensor means operable to supply signals representing the magnitude of a sensed magnetic field comprising an earth magnetic field component and a magnetic field distortion component, and means responsive to said signals for providing a heading as the angular displacement of an alignment axis of the compass relative to magnetic north, the method comprising the steps of:

as the compass is displaced angularly, storing measured values of the magnitude of the sensed magnetic field for different discrete orientations of the alignment axis of the compass;

if said measured values have been stored for more than a predetermined number, but not all, of said directions, interpolating, using estimated coordinates for said origin, values of the sensed magnetic field for directions for which measured values have not been accumulated to provide a complete set of values $(X_i, Y_i)$ corresponding to a complete rotation of the alignment axis, said set of values defining a substantially elliptical locus of a vector $(E_T)$ representing the sensed magnetic field;

deriving from said set of values new estimated coordinates for said origin and adjusting the stored measured values to take account of differences, if any, between the previous estimated origin coordinates and the new estimated origin coordinates; and deriving said heading taking into account ellipticity of said locus due to said local magnetic field distortion.

2. A method as claimed in claim wherein each interpolated value is generated by performing a linear interpolation between values for directions adjacent the direction for which the interpolated value is to be generated.

3. A method as claimed in claim 1, further comprising the steps of accumulating additional said measured values and reducing correspondingly the proportion of interpolated values in said set of values.

4. A method as claimed in claim 1, wherein said measured values comprise pairs of coordinate values, each pair defining the magnitude of the sensed magnetic field, and said method includes the step of deriving the direction of the sensed magnetic field from said coordinate values and storing each pair of coordinate values according to such direction.

5. A method as claimed in claim 1, wherein said step of deriving new estimated origin coordinates comprises the step of computing each new origin coordinate as an average of corresponding values in said set of values.

6. A method as claimed in claim 5, wherein, before any measured values are stored, initial estimated origin coordinates are estimated by averaging several values of said signals.

7. A method as claimed in claim 1, wherein the step of deriving said heading comprises the step of generating parameters representing an ellipse approximating said set of values, computation of said parameters comprising the steps of:

determining from said set of values the phase rotation angle $(\Omega_e)$ of said elliptical locus relative to said alignment axis;

deriving from said set of values the ratio $(E_R/E_L)$ between a pair of counter-rotating vectors, one of the pair of vectors $(E_L)$ representing the earth magnetic field component and the other of said pair of vectors $(E_R)$ representing soft-iron magnetic field distortion, the resultant of such pair of vectors comprising the sensed magnetic field vector $(E_T)$ and the phase difference, $(\phi_R)$ between the vectors $(E_R$ and $E_L)$ being substantially twice the rotation angle $(\Omega_e)$;

deriving from said ratio $(E_R/E_L)$, said phase difference $(\phi_R)$, and said estimated coordinates of said origin, headings corrected for said soft-iron magnetic field distortion.

8. A method as claimed in claim 7, wherein the phase rotation angle $(\Omega_e)$ is determined as the value of $\theta$ for which $$S(\theta) = \sum_{i=1}^{N} (R_b^i)^2 |\cos(\theta_b^i - \theta)|$$

is a minimum, where $R_b^i$ and $\theta_b^i$ are the amplitude and phase, respectively, of the sensed magnetic field and N is the number of values in said set of values.

9. A method as claimed in claim 7, wherein the step of computing the ratio $(E_R/E_L)$ includes the step of transforming the coordinate values $\{X_E(k)$ and $Y_E(k)\}$ of said set of values to form a set of transformed coordinate values $(X_i'$ and $Y_i')$, respectively, according to the expression:

$$X_i' = \{X_i - X_C\} \cos(\Omega_e) + \{Y_i - Y_C\} \sin(\Omega_e)$$

$$Y_i' = \{Y_i - Y_C\} \cos(\Omega_e) - \{X_i - X_C\} \sin(\Omega_e)$$

incrementing the absolute averages of $X_i'$ and $Y_i'$ relative to their respective axes until such absolute averages are equal, and deriving the ratio $(E_R/E_L)$ in accordance with the expression:

$$\frac{E_R}{E_L} = 1 - \frac{R_x(L)}{R_x(1)M(L)}$$

where $M(L)$ is the total incremental ratio of the absolute values and $R_x(1)/R_x(L)$ is the average envelope variation of the values of $Y_i$ in the $X'$ direction.

10. A method as claimed in claim 7, wherein the corrected heading is derived in accordance with the expression:

$$\theta_L = \tan^{-1}\left\{\frac{\left(\frac{1 + E_R/E_L}{1 - E_R/E_L}\right)((Y_E(k) - Y_C)\cos(\Omega_e) - (X_E(k) - X_C)\sin(\Omega_e))}{(X_E(k) - X_C)\cos(\Omega_e) + (Y_E(k) - Y_C)\sin(\Omega_e)}\right\} + \Omega_e$$

11. A method as claim in claim 7, wherein the corrected heading is derived iteratively in accordance with the expression:

$$\theta_L^{n+1} \approx \theta_E - \frac{E_R}{E_L} \sin(\phi_R - \theta_L^n - \theta_E),$$

with the initial condition $\theta_L{}^0 = \theta_E$, where $\phi_R$ is equal to twice the ellipse rotation angle ($\Omega_e$).

12. A method as claimed in claim 1, wherein the steps of interpolating values and adjusting said measured values are repeated a predetermined number of times before the parameters of the ellipse are computed.

13. A method as claimed in claim 1, including the step of storing said parameters of said ellipse when the compass is deactivated and regenerating the measured values from the stored parameters when the compass is reactivated.

14. A method as claimed in claim 13, wherein the storing of said parameters is enabled only after a predetermined number of measured values have been accumulated.

15. A method as claimed in claim 1, further comprising the step of monitoring changes in said set of values and restarting the calibration process if the change between successive sets of values exceeds a predetermined threshold.

16. A method of calibrating a magnetic compass comprising a sensor means operable to supply signals representing the magnitude of a sensed magnetic field comprising an earth magnetic field component and a magnetic field distortion component, and means responsive to said signals for providing a heading as the angular displacement axis of the compass relative to magnetic north, the method comprising the steps of:

deriving a set of values representing the direction and magnitude of a sensed magnetic field as the compass alignment axis is displaced angularly, said set of values defining a substantially elliptical locus of a full rotation of vector ($E_T$) representing the sensed magnetic field;

determining from said set of values the phase rotation angle ($\Omega_e$) of said elliptical locus relative to said alignment axis and coordinates of the origin of the elliptical locus;

deriving from said set of values the ratio between a pair of counter-rotating vectors, one of the pair of vectors ($E_L$) representing the earth magnetic field component and the other of said pair of vectors ($E_R$) representing soft-iron magnetic field distortion, the resultant of such pair of vectors comprising the sensed magnetic field vector ($E_T$) and the phase, difference ($\phi_R$) between the vectors of the pair being twice the phase rotation angle ($\Omega_e$);

deriving from said ratio ($E_R/E_L$), said phase rotation angle ($\phi_R$), and said coordinates of the origin, headings corrected for said soft-iron magnetic field distortion.

17. A method as claimed in claim 16, wherein the phase rotation angle ($\Omega_e$) is determined as the value of $\theta$ for which $$S(\theta) = \sum_{i=1}^{N} (R_b{}^i)^2 |\cos(\theta_b{}^i - \theta)|$$

is a minimum, where $R_b{}^i$ and $\theta_b{}^i$ are the amplitude and phase, respectively, of the sensed magnetic field.

18. A method as claimed in claim 16, wherein the step of computing the ratio ($E_R/E_L$) includes the step of transforming the coordinate values ($X_i$ and $Y_i$) in said set of values to form transformed coordinate values $X_i'$ and $Y_i'$, respectively, according to the expression:

$$X_i' = (X_i - X_C)\cos(\Omega_e) + (Y_i - Y_C)\sin(\Omega_e)$$

$$Y_i' = (Y_i - Y_C)\cos(\Omega_e) - (X_i - X_C)\sin(\Omega_e)$$

incrementing the absolute averages of $X_i'$ and $Y_i'$ relative to their respective axes until such absolute averages are equal, and deriving the ratio ($E_R/E_L$) in accordance with the expression:

$$\frac{E_R}{E_L} = 1 - \frac{R_x(L)}{R_x(1)M(L)}$$

where $M(L)$ is the total incremental ratio of the absolute values and $R_x(1)/R_x(L)$ is the average envelope variation of the values of $Y_i$ in the $X'$ direction.

19. A method as claimed in claim 16, wherein the corrected heading ($\theta_L$) is derived in accordance with the expression:

$$\theta_L = \tan^{-1}\left\{ \frac{\left(\frac{1 + E_R/E_L}{1 - E_R/E_L}\right)((Y_E(k) - Y_C)\cos(\Omega_e) - (X_E(k) - X_C)\sin(\Omega_e))}{(X_E(k) - X_C)\cos(\Omega_e) + (Y_E(k) - Y_C)\sin(\Omega_e)} \right\} + \Omega_e.$$

20. A method as claimed in claim 16, wherein the corrected heading is derived iteratively in accordance with the expression:

$$\theta_L^{n+1} \approx \theta_E - \frac{E_R}{E_L}\sin(\phi_R - \theta_L^n - \theta_E),$$

with the initial condition $\theta_L{}^0 \theta_E$, where $\phi_R$ is equal to twice the ellipse rotation angle ($\Omega_e$) and $\theta_E$ is the phase of the sensed magnetic field vector.

21. A method as claimed in claim 16, wherein the steps of interpolating values and adjusting said measured values are repeated a predetermined number of times before the parameters of the ellipse are computed.

22. A method as claimed in claim 16, including the step of storing said parameters of said ellipse when the compass is deactivated and regenerating the measured values from the stored parameters when the compass is reactivated.

23. A method as claimed in claim 22, wherein the storing of said parameters is enabled only after a predetermined number of measured values have been accumulated.

24. A method as claimed in claim 16, further comprising the step of monitoring changes in said set of values and restarting the calibration process if the change between successive sets of values exceeds a predetermined threshold.

25. A magnetic compass comprising sensor means (10-27) operable to supply signals representing the magnitude of a sensed magnetic field comprising an earth magnetic field component and a magnetic field distortion component, and means (28) responsive to said signals for providing a heading as the angular displacement of an alignment axis of the compass relative to magnetic north, the means responsive to said signals comprising storage means (37) for storing, as the compass is displaced angularly, measured values $(X_E, Y_E)$ of the magnitude of the sensed magnetic field for different discrete directions of the alignment axis of the compass relative to an origin of the sensor; interpolator means (39) operable if said measured values have been stored for more than a predetermined number, but not all, of said directions, to interpolate, using estimated coordinates for said origin, values of the magnetic field for directions for which measured values have not been accumulated to provide a complete set of values $(X_i, Y_i)$ corresponding to a complete rotation of the alignment axis, said set of values defining a substantially elliptical locus of a vector $(E_T)$ representing the sensed magnetic field; origin computation means (35) for deriving from said set of values new estimated coordinates for said origin and means (40), responsive to the set of values and the new estimated origin coordinates for adjusting the stored measured values to take account of differences, if any, between the previous estimated origin coordinates and the new estimated origin coordinates; and means (36) responsive to said set of values and said new estimated origin coordinates for deriving said heading taking into account ellipticity of said locus due to said local magnetic field distortion.

26. A magnetic compass as claimed in claim 1, wherein said interpolation means is functional to generate each interpolated value by performing a linear interpolation between values for directions adjacent the direction for which the interpolated value is to be generated.

27. A magnetic compass as claimed in claim 1, wherein said storage means is functional to accumulate additional said measured values and said interpolation means is functional to reduce correspondingly the proportion of interpolated values in said set of values.

28. A magnetic compass as claimed in claim 1, wherein said sensor means provides said measured values as pairs of coordinate values $(X_E, Y_E)$, each pair defining the magnitude of the sensed magnetic field, and said magnetic compass further comprises phase computation means (42) for deriving the direction of the sensed magnetic field from said coordinate values, said storage means being arranged for storing each pair of coordinate values according to such direction.

29. A magnetic compass as claimed in claim 1, wherein said origin computation means (35) is functional to derive said new estimated origin coordinates by computing each new origin coordinate as an average of corresponding values in said set of values.

30. A magnetic compass as claimed in claim 29, further comprising origin estimation means (46) functional, before any measured values are stored, to estimate initial estimated origin coordinates by averaging several values of said signals.

31. A magnetic compass as claimed in claim 1, wherein the means for deriving said heading comprises ellipse parameter computation means (49) responsive to the set of values and the new estimated origin coordinates for generating parameters representing an ellipse approximating said set of values, said ellipse parameter computation means being functional to generate said parameters by:

determining from said set of values the phase rotation angle $(\Omega_e)$ of said elliptical locus relative to said alignment axis;

deriving from said set of values the ratio $(E_R/E_L)$ between a pair of counter-rotating vectors, one of the pair of vectors $(E_L)$ representing the earth magnetic field component and the other of said pair of vectors $(E_R)$ representing soft-iron magnetic field distortion, the resultant of such pair of vectors comprising the sensed magnetic field vector $(E_T)$ and the phase difference $(\phi_R)$ between the vectors $E_R$ and $E_L$ being substantially twice the rotation angle $(\Omega_e)$;

deriving from said ratio $(E_R/E_L)$, said phase difference $(\phi_R)$, and said estimated coordinates of said origin, headings corrected for said soft-iron magnetic field distortion.

32. A magnetic compass as claimed in claim 31, wherein the ellipse parameter computation means is functional to derive the phase rotation angle $(\Omega_e)$ as the value of $\theta$ for which $$S(\theta) = \sum_{i=1}^{N} (R_b^i)^2 |\cos(\theta_b^i - \theta)|$$

is a minimum, where $R_b^i$ and $\theta_b^i$ are the amplitude and phase, respectively, of the sensed magnetic field and N is the number of values in said set of values.

33. A magnetic compass as claimed in claim 31, wherein the ellipse parameter computation means is functional to compute the ratio $(E_R/E_L)$ by transforming the coordinate values $(X_i$ and $Y_i)$ of said set of values to form a set of transformed coordinate values $(X_i'$ and $Y_i')$, respectively, according to the expression:

$$X_i' = (X_i - X_C) \cos(\Omega_e) + (Y_i - Y_C) \sin(\Omega_e)$$

$$Y_i' = (Y_i - Y_C) \cos(\Omega_e) - (X_i - X_C) \sin(\Omega_e)$$

incrementing the absolute averages of $X_i'$ and $Y_i'$ relative to their respective axes until such absolute averages are equal, and deriving the ratio $(E_R/E_L)$ in accordance with the expression:

$$\frac{E_R}{E_L} = 1 - \frac{R_x(L)}{R_x(1)M(L)}$$

where M(L) is the total incremental ratio of the absolute values and $R_x(1)/R_x(L)$ is the average envelope variation of the values of $Y_i$ in the X' direction.

34. A magnetic compass as claimed in claim 31, wherein the means for deriving the heading comprises means (50) responsive to the output of the ellipse parameter computation means for deriving the corrected heading in accordance with the expression:

$$\theta_L = \tan^{-1}\left\{ \frac{\left(\frac{1 + E_R/E_L}{1 - E_R/E_L}\right)((Y_E(k) - Y_C)\cos(\Omega_e) - (X_E(k) - X_C)\sin(\Omega_e))}{(X_E(k) - X_C)\cos(\Omega_e) + (Y_E(k) - Y_C)\sin(\Omega_e)} \right\} + \Omega_e$$

35. A magnetic compass as claimed in claim 31, wherein the means for deriving the heading comprises means (50) responsive to the output of the ellipse parameter computation means for deriving the corrected heading iteratively in accordance with the expression:

$$\theta_L^{n+1} \simeq \theta_E - \frac{E_R}{E_L} \sin(\phi_R - \theta_L^n - \theta_E),$$

with the initial condition $\theta_L^0 \theta_E$, where $\phi_R$ is equal to twice the ellipse rotation angle $(\Omega_e)$.

36. A magnetic compass as claimed in claim 25, wherein the interpolation means (39) and adjusting means (40) are functional to interpolate said interpolated values and adjust said measured values a predetermined number of times before said ellipse parameter computation means computes parameters of the ellipse are computed.

37. A magnetic compass as claimed in claim 25, including second storage means (45) for storing said parameters of said ellipse when the compass is deactivated and means (49) for regenerating the measured values from the stored parameters when the compass is reactivated.

38. A magnetic compass as claimed in claim 37, wherein the ellipse parameter computation means (49) and said second storage means (45) are functional to store said parameters only after a predetermined number of measured values have been accumulated.

39. A magnetic compass as claimed in claim 25, further comprising means (53) for monitoring changes in said set of values and restarting the calibration process if the change between successive sets of values exceeds a predetermined threshold.

40. A magnetic compass comprising sensor means (10-27) operable to supply signals $(X_E\{k\}, Y_E\{k\})$ representing the magnitude of a sensed magnetic field comprising an earth magnetic field component and a magnetic field distortion component, and means (28) responsive to said signals for providing a heading as the angular displacement axis of the compass relative to magnetic north, the means responsive to said signals being functional to derive a set of values representing the direction and magnitude of a sensed magnetic field as the compass alignment axis is displaced angularly, said set of values defining a substantially elliptical locus of a full rotation of vector $(E_T)$ representing the sensed magnetic field; determine from said set of values the phase rotation angle $(\Omega_e)$ of said elliptical locus relative to said alignment axis and coordinates of the origin of the elliptical locus; derive from said set of values the ratio between a pair of counter-rotating vectors, one of the pair of vectors $(E_L)$ representing the earth magnetic field component and the other of said pair of vectors $(E_R)$ representing non-permanent magnetic field distortion, the resultant of such pair of vectors comprising the sensed magnetic field vector $(E_T)$ and the phase difference $(\phi_R)$ between the vectors of the pair being twice the phase rotation angle $(\Omega_e)$; and derive from said ratio $(E_R/E_L)$, said phase rotation angle $(\phi_R)$, and said coordinates of the origin, headings corrected for said non-permanent magnetic field distortion.

41. A magnetic compass as claimed in claim 40, wherein the means responsive to said signals is functional to derive the phase rotation angle $(\Omega_e)$ as the value of $\theta$ for which $$S(\theta) = \sum_{i=1}^{N} (R_b^i)^2 |\cos(\theta_b^i - \theta)|$$

is a minimum, where $R_b^i$ and $\theta_b^i$ are the amplitude and phase, respectively, of the sensed magnetic field.

42. A magnetic compass as claimed in claim 40, wherein the means responsive to said signals comprises means (49) for computing the ratio $(E_R/E_L)$ by transforming the coordinate values $(X_i$ and $Y_i)$ in said set of values to form transformed coordinate values $X_i'$ and $Y_i'$, respectively, according to the expression:

$$X_i' = (X_i - X_C) \cos(\Omega_e) + (Y_i - Y_C) \sin(\Omega_e)$$

$$Y_i' = (Y_i - Y_C) \cos(\Omega_e) - (X_i - X_C) \sin(\Omega_e)$$

incrementing the absolute averages of $X_i'$ and $Y_i'$ relative to their respective axes until such absolute averages are equal, and deriving the ratio $(E_R/E_L)$ in accordance with the expression:

$$\frac{E_R}{E_L} = 1 - \frac{R_x(L)}{R_x(1)M(L)}$$

where $M(L)$ is the total incremental ratio of the absolute values and $R_x(1)/R_x(L)$ is the average envelope variation of the values of $Y_i$ in the $X'$ direction.

43. A magnetic compass as claimed in claim 40, wherein the means responsive to said signals comprises means (50) for deriving a corrected heading in accordance with the expression:

$$\theta_L = \text{Tan}^{-1} \left\{ \frac{\left(\frac{1 + E_R/E_L}{1 - E_R/E_L}\right)((Y_E(k) - Y_C)\cos(\Omega_e) - (X_E(k) - X_C)\sin(\Omega_e))}{(X_E(k) - X_C)\cos(\Omega_e) + (Y_E(k) - Y_C)\sin(\Omega_e)} \right\} + \Omega_e.$$

44. A magnetic compass as claimed in claim 40, wherein the means responsive to said signals comprises means (50) for deriving a corrected heading iteratively in accordance with the expression:

$$\theta_L^{n+1} \simeq \theta_E - \frac{E_R}{E_L} \sin(\phi_R - \theta_L^n - \theta_E),$$

with the initial condition $\theta_L^0 = \theta_E$, where $\phi_R$ is equal to twice the ellipse rotation angle $(\Omega_e)$ and $\theta_E$ is the phase of the sensed magnetic field vector.

45. A magnetic compass as claimed in claim 40, wherein the interpolation means (39) and adjustment means (40) interpolating values and adjusting said measured values a predetermined number of times before the ellipse parameter computation means computes parameters of the ellipse.

46. A magnetic compass as claimed in claim 40, further comprising second storage means (45) for storing said parameters of said ellipse when the compass is deactivated and means (52) for regenerating measured values from the stored parameters when the compass is reactivated.

47. A magnetic compass as claimed in claim 46, wherein the second storage means (45) and ellipse parameter computation means (49) are functional to store said parameters only after a predetermined number of measured values have been accumulated.

48. A magnetic compass as claimed in claim 40, further comprising means (53) for monitoring changes in said set of values and restarting the calibration process if the change between successive sets of values exceeds a predetermined threshold.

* * * * *